United States Patent [19]

Verberne

[11] Patent Number: 5,788,393
[45] Date of Patent: Aug. 4, 1998

[54] ATTACHMENT

[76] Inventor: Constans Johannes Verberne, Skolebakken15, N-2830 Raufoss, Norway

[21] Appl. No.: 700,419
[22] PCT Filed: Feb. 27, 1995
[86] PCT No.: PCT/NO95/00043
 § 371 Date: Aug. 28, 1996
 § 102(e) Date: Aug. 28, 1996
[87] PCT Pub. No.: WO95/23938
 PCT Pub. Date: Sep. 8, 1995

[30] Foreign Application Priority Data

Mar. 1, 1994 [NO] Norway ................................. 940702

[51] Int. Cl.$^6$ ................................................. F16B 1/00
[52] U.S. Cl. ................................................. 403/28; 403/179
[58] Field of Search ....................... 403/28, 29, 30, 403/24, 206, 208, 179, 286, 410; 285/904, 187

[56] References Cited

U.S. PATENT DOCUMENTS

| | | |
|---|---|---|
| 1,635,957 | 7/1927 | Richardson . |
| 4,376,798 | 3/1983 | Diaz ................................. 403/28 X |
| 4,447,966 | 5/1984 | Mollenkopf et al. .............. 403/28 X |
| 4,764,084 | 8/1988 | Parker et al. ..................... 403/28 X |
| 4,907,743 | 3/1990 | Bouiller et al. ................... 285/187 X |
| 5,074,697 | 12/1991 | Blanpain et al. .................. 403/28 |
| 5,427,449 | 6/1995 | Christenson et al. ............. 403/28 X |
| 5,443,290 | 8/1995 | Boyer et al. ...................... 285/187 X |
| 5,445,469 | 8/1995 | Huck et al. ....................... 403/30 |

FOREIGN PATENT DOCUMENTS

| | | |
|---|---|---|
| 2069262 | 9/1971 | France . |
| 360163 | 9/1973 | Sweden . |
| 2069653 | 8/1981 | United Kingdom . |

*Primary Examiner*—Harry C. Kim
*Attorney, Agent, or Firm*—Sterne, Kessler, Goldstein & Fox P.L.L.C.

[57] ABSTRACT

An attachment for permanent fastening to a wall surface which is deformed when subjected to a load or thermal influence, comprising at least two plate elements to which at least one attachment member is fastened and at least a deformable connecting member connecting the plate elements.

11 Claims, 2 Drawing Sheets

ATTACHMENT

FIELD OF THE INVENTION

The present invention relates to an attachment for permanent fastening to a wall surface which is deformed when subjected to a load or thermal influence.

BACKGROUND OF THE INVENTION

For lifting or retaining tubes, receptacles and other objects which comprise one or more wall surfaces these are equipped with different types of hook fasteners or similar, for instance ears for crane hooks. Such attachments cause large local stress concentrations when they are under load. In order to avoid or reduce such concentrations use can be made of wrapped bands or similar. For tubes and receptacles which are to be subjected to large inner pressures or which are to be subjected to thermal influence which normally will cause expansion or contraction the expansion or contraction of the tubes or receptacles due to the pressure or changes of the temperature will be prevented in the band areas, while the remainder of the wall of the tubes or receptacles may expand or contract. Thereby stress concentrations will occur along the edge zones of the bands.

For tubes and receptacles of for instance fiber reinforced plastics care should be taken to provide a relatively large fastening area, due to the tendency of the material to burst if concentrated loadings occur. An attachment member being deformable to a small degree and which extends along and is fastened to a larger part of the circumference of a tube or a receptacle will have a detrimental effect, because the area where the attachment member is situated will mainly be prevented in expanding or contracting together with the remainder of the tube or the receptacle when inner excess pressure occurs. This leads to stress concentrations at the edge zones of the attachment member.

SUMMARY OF THE INVENTION

By the present invention is achieved an attachment which does not prevent, or which only to a small degree prevents expansion or contraction of a wall portion to which the attachment is fastened.

The attachment according to the invention is characterized in that it comprises at least two plate elements to which at least one attachment member is fastened and at least a deformable connecting member connecting the plate elements.

The attachment can be fastened to a tube or receptacle wall in many different ways, as by glueing, riveting, screwing, but the shape of the attachment is particularly suited to be integrated in a tube or receptacle wall made by winding, for instance of a band of fiber reinforced plastics. The attachment member may be positioned on a winding mandrel prior to the winding, but it may be convenient firstly to wind at least one layer of the band on the mandrel, whereupon the attachment is brought into place and the remainder layers of the band are wound around it. Thereby the innermost wound layer ensures that the attachment does not fall into the tube or receptacle.

Due to the connecting member or members a correct shape of the attachment is maintained prior to and during the fastening to the tube or receptacle, so that the plate elements will be situated in a correct initial position. Moreover, by intentional deformation of the connecting member or members prior to the assembly the distance between the plate elements can be adjusted.

Many possibilities are present regarding the design of the connecting member or members. The member or members may be situated mainly in the same plane as the plate elements, without this being a requirement. As regards the location of the connecting member or members many possibilities are also present. The member or members may for instance be situated between the plate elements and may for instance have a zigzag shape, and it or they may be situated protruding outwardly from the gap between the plate elements. The attachment may comprise a larger number of plate elements which are connected through connecting members.

Due to the fact that the attachment is to transfer forces, steel or metal is a near at hand choice of material, but also other materials such as a composite material can be used. This can be accommodated to the individual cases of use.

The invention will in the following be explained more detailed by means of an example of an embodiment.

DETAILED DESCRIPTION

Figure 1:
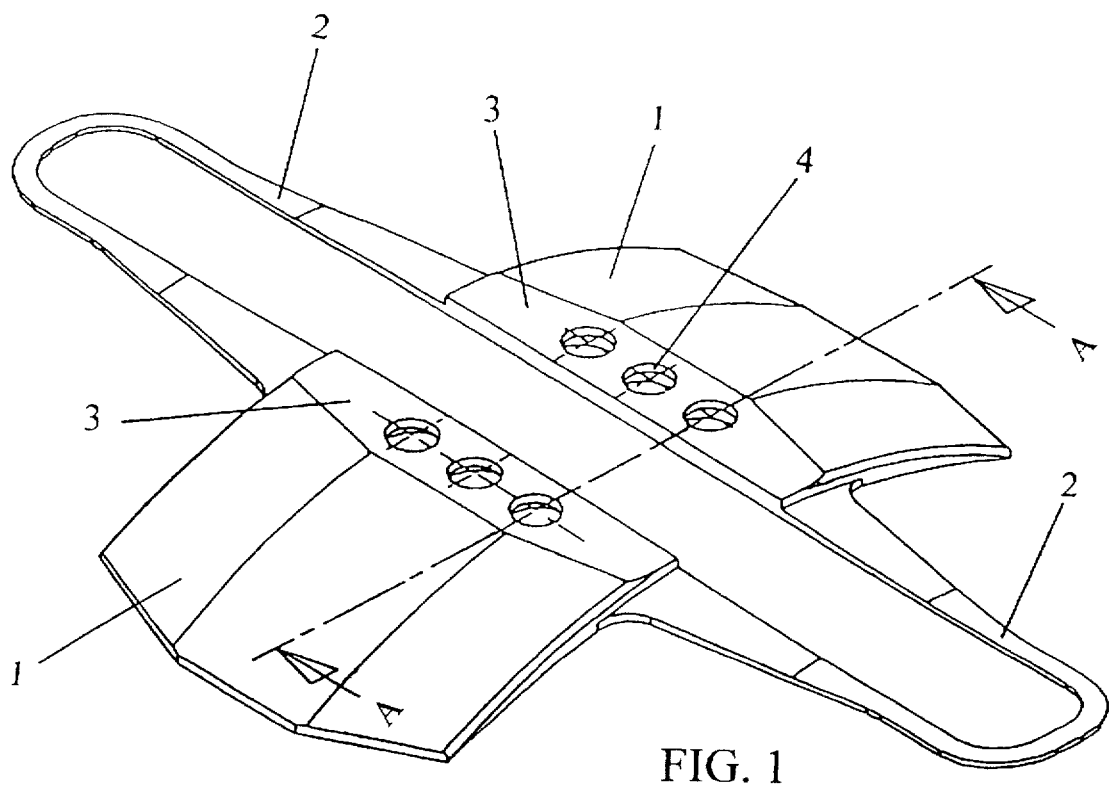
FIG. 1 shows in perspective an attachment according to the invention, adapted to a curved wall surface.

FIG. 1 shows an attachment having two plate elements 1 which are mutually spaced and are connected through two connecting members 2 on the outside of the plate elements 1. The plate elements 1 are curved, for use on or in a correspondingly curved wall. The plate elements 1 are shown with a varying thickness, which decreases towards those edges which are not connected to the connecting members 2. The connecting members have U-shape and are thinner than the plate elements 1, and they have a varying width in those strips of material which constitute the connecting members, the width being largest nearest to the plate elements 1.

Figure 2:
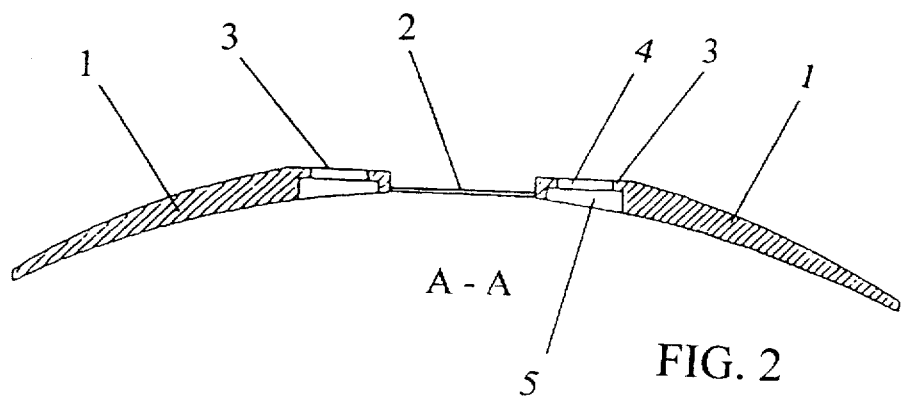
FIG. 2 shows a section along the line A—A in FIG. 1.
Figure 3:
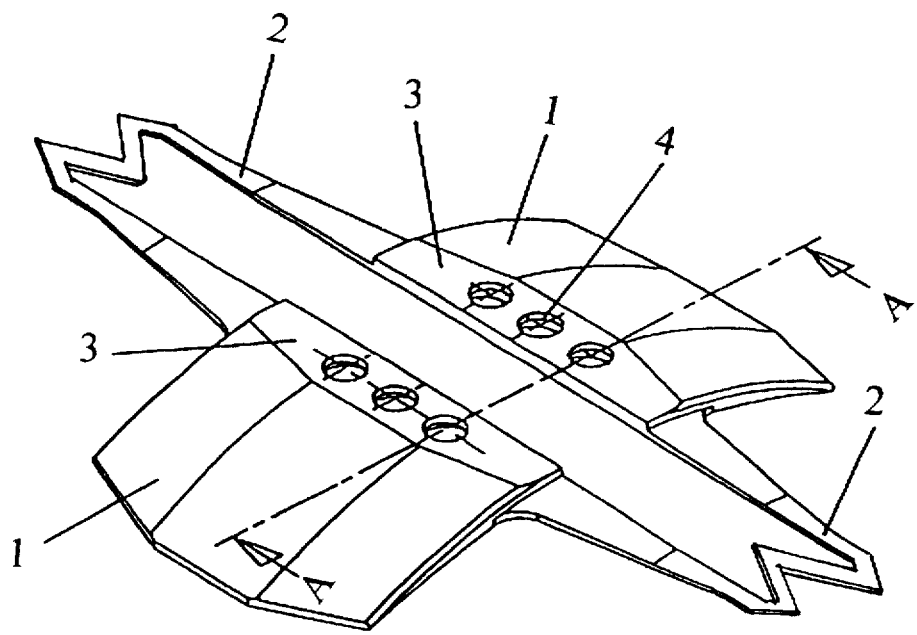
FIG. 3 shows in perspective an attachment according to the invention, with zig-zag shaped connecting members.
Figure 4:
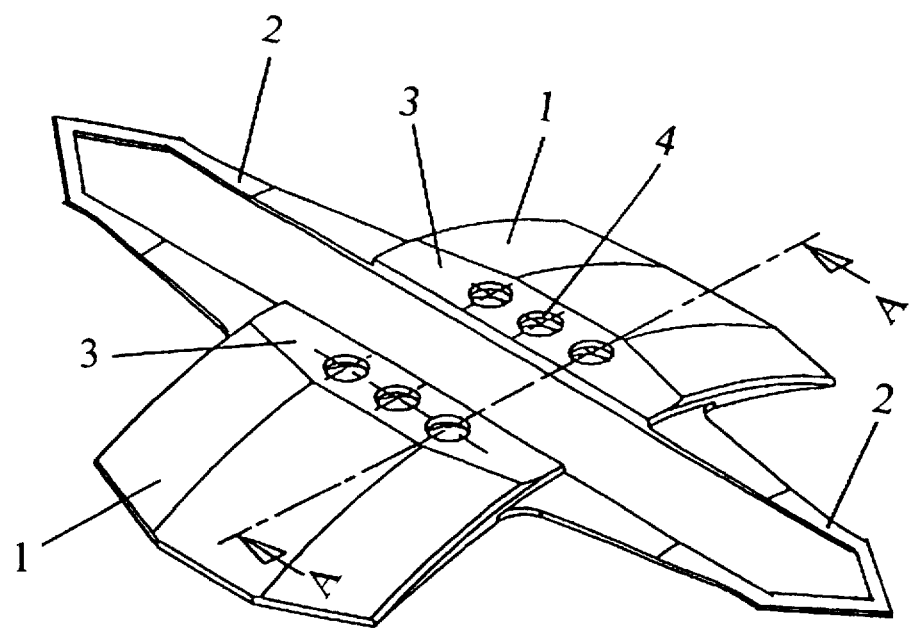
FIG. 4 shows in perspective an attachment according to the invention, with V-shaped connecting members.

Thus, an elongate opening has been formed, delimited by the connecting members 2 and those edges of the plate elements 1 which face each other. Along these edges are formed apertures 4 for fastening members, such as bolts (not shown), in the example shown six apertures. As it particularly appears from FIG. 2 each aperture 4 has a widened portion 5 towards the underside of the plate elements 1. Thereby bolt heads can be inserted in the widened portions 5, having the bolts projecting up through the apertures 4. Moreover, those areas of the plate elements 1 where the apertures 4 are situated are flattened on the upper surface, so that planar supports are formed, for instance for lifting bails which are fastened by means of the bolts.

When the plate elements 1, possibly also the connecting members 2, are fastened to a wall which is subjected to such loadings that the wall tends to expand or contract in a direction transversely of the longitudinal direction of the elongate opening in the middle of the attachment, the connecting members 2 will be deformed by bending, so that the relatively undeformable plate elements 1 can follow those wall portions to which they are fastened. The size of the plate elements 1 and their number can be adapted to the individual cases of use.

The connecting members 2 will, due to their small thickness and that they constitute relatively elongate U-shaped bails transversely of the direction of expansion or contraction of the wall, cause little resistance against expansion and contraction.

I claim:

1. An attachment for permanent fastening to a wall surface which is deformed when subjected to a load or thermal influence, comprising:
   at least two plate elements situated in a mutual distance each of said two plate elements having a curved inner surface for attaching to the wall surface wherein the curved inner surfaces of the plate elements extend along same radius of curvature;
   at least one fastening member for fastening said attachment to the wall surface; and
   a deformable connecting member connecting said at least two plate elements in order to allow movement of said at least two plate elements away from and towards each other when following deformations of the wall surface.

2. An attachment according to claim 1, wherein said at least two plate elements have mutually facing edge portions, and said connecting member is fastened to each of said edge portions.

3. An attachment according to claim 1, wherein said connecting member has a curved shape which causes said connecting member to be bent when said at least two plate elements are moved away from or towards each other.

4. An attachment according to claim 3, wherein said connecting member has a U shape, the ends of said U shape being fastened to a respective one of said at least two plate elements.

5. An attachment according to claim 1, wherein said connecting member a zigzag shape, the ends of said connecting member being fastened to a respective one of said at least two plate elements.

6. An attachment according to claim 1, wherein said at least two plate elements are curved along a common bidirectionally curved surface.

7. An attachment according to claim 1, wherein said at least one fastening member comprises a bolt.

8. An attachment according to claim 1, wherein said connecting member has an angled shape which causes said connecting member to be bent when said at least two plate elements are moved away from or towards each other.

9. An attachment according to claim 8, wherein said connecting member has a V shape, the ends of said V shape being fastened to a respective one of said at least two plate elements.

10. An attachment according to claim 1, wherein said at least two plate elements are curved along a common unidirectionally curved surface.

11. An attachment according to claim 1, further comprising:
   a plurality of fastening members, said plurality of fastening members disposed along mutually facing edges of said at least two plate elements.

* * * * *